3,260,708
ELASTOMERIC OLEFINIC COPOLYMERS AND
PROCESS FOR PRODUCING THE SAME
Giulio Natta, Giorgio Mazzanti, Alberto Valvassori, Guido Sartori, and Nazzareno Cameli, all of Milan, Italy, assignors to Montecatini Societa Generale per l'Industria Mineraria e Chimica, Milan, Italy, a corporation of Italy
No Drawing. Filed Oct. 16, 1962, Ser. No. 231,031
Claims priority, application Italy, Oct. 18, 1961, 18,834/61; May 24, 1962, 10,340/62
34 Claims. (Cl. 260—79.5)

This invention relates to new, amorphous, linear, high molecular weight, copolymers of non-conjugated cyclic polyenes or alkylpolyenes, with ethylene and one or more aliphatic alpha-olefins of the general formula

R—CH=CH₂ wherein R is an alkyl group containing from 1 to 6 carbon atoms.

More particularly, the present invention provides new amorphous linear high molecular weight copolymers of the stated monomers, which conatin, in each macromolecule, monomeric units originating from each one of the starting monomers.

The invention also provides a process for the preparation of said new copolymers, utilizing catalysts of the co-ordinated anionic type.

Earlier applications disclosed the possibility of preparing unsaturated copolymers by the copolymerization of ethylene and aliphatic alpha-olefins with non-conjugated dienes containing at least one terminal double bond.

It was not known previously, nor was it predictable, that linear, amorphous, and vlucanizable copolymers of ethylene, one or more higher alpha-olefins, and non-conjugated cyclic dienes and polyenes could be obtained.

Surprisingly, it has been found that, using particular catalysts prepared from vanadium compounds and organo-metallic compounds or hydrides of metals of groups I, II, or III, or complex organometallic compounds or complex hydrides of metals of groups I and III, or mixtures of said compounds, and which act with or through a co-ordinated anionic mechanism, it is possible to obtain amorphous linear copolymers of molecular weight higher than 20,000, of non-conjugated cyclic polyenes or alkyl-polyenes with ethylene and one or more alpha-olefins of the general formula R—CH=CH₂, wherein R is an alkyl group containing from 1 to 6 carbon atoms, which copolymers consist of macromolecules containing un-saturations and made up of monomeric units originating from each one of the empolyed monomers.

This was not foreseeable inasmuch as the co-ordinated anionic catalysts used for the copolymerization do not promote the homopolymerization of the non-conjugated cyclic polyenes. In the copolymers made possible by this invention, two monomeric units originating from the cyclic diene or cyclic polyene are never directly linked to each other, and the monomeric units are therefore well-distributed along the copolymer chain, resulting in vul-canizable copolymers which yield vulcanizates having good mechanical properties.

The following non-conjugated cyclic polyenes can be employed in producing the new copolymers of this invention: cycloheptadiene-1,4; cyclooctadiene-1,5; cyclo-octadiene-1,4; cyclodecadiene-1,6; cyclodecadiene-1,5; cy-clododecadiene-1,7, cyclododecatriene-1,5,9.

Alkyl-cyclopolyenes can be used, particularly the non-conjugated alkyl-cyclodiolefins such as: 1-methyl-cyclo-octadiene-1,5; 3-methyl-cyclooctadiene-1,5; 3,4-dimethyl-cyclooctadiene-1,5; and 3,7-dimethyl-cyclooctadiene-1,5.

The alpha-olefins which may be employed together with ethylene in the preparation of the new copolymers have the general formula CH₂=CHR, wherein R is an alkyl group containing from 1 to 6 carbon atoms, particularly propylene and butene-1. Particularly valuable terpoly-mers are obtained from ethylene, propylene (or butene-1) and cyclooctadiene-1,5.

For instance, by polymerizing a mixture of ethylene, propylene and cyclooctadiene-1,5, or of ethylene, butene-1 and cyclooctadiene-1,5 according to the conditions of the herein claimed process, a crude polymerization product is obtained which consists of macromolecules each one of which contains units derived from ethylene, propylene (or butene-1), and cyclooctadiene-1,5.

Each one of the monomeric units originating from polymerization of the cyclodiolefin still contains a free double bond, as said unit exists in the copolymer macro-molecular main chain. This indicates that the double bonds in the starting cyclodiolefin behave differently from each other, or more specifically, that when one of the double bonds is utilized in the propagation process, the other becomes inert to polymerization so that the growth of the macromolecules does not subsequently effect that free double bond. The macromolecules of the copolymer are thus substantially linear and contain unsaturated cyclic groups.

The copolymerization products of this invention are substantially linear, as evidenced by the fact that they have a viscosimetric behavior similar to the one of known linear copolymers, e.g., of a linear ethylene-propylene copolymer.

The copolymerization products of the present invention may be defined as being practically homogeneous compositions. A confirmation of the homogeneity is found, for instance, in the fact that the copolymers are easily and readily converted to vulcanized products using the recipes and the techniques normally employed for the vulcanization of unsaturated rubbers having a low un-saturation content, as for instance butyl rubber. This shows, also, that the unsaturated linkages are well distributed along the main chain of the copolymer macro-molecules.

The vulcanizates so obtained are wholly insoluble in the organic solvents and are only slightly swollen by some organic solvents, such as aromatic hydrocarbons. In contrast, the present unvulcanized copolymers are totally extractable with boiling n-heptane.

The vulcanizates (vulcanized rubbers) obtained from the copolymers have very good mechanical strength and show very low residual deformation after breaking.

The new copolymerizates are obtained by carrying out the copolymerization in a dispersion, or in a solution, of the anionic co-ordination catalyst in an inert liquid polymerization medium.

The anionic co-ordination catalysts used are obtained by mixing vanadium compounds with organometallic compounds or hydrides of metals belonging to groups I to III, inclusive of the Periodic Table, or with complex organo-metallic compounds or complex hydrides of metals of groups I and III, or with mitxures of said compounds. Preferred metals whose compounds are used as catalyst components are: lithium, sodium, potassium, rubidium, cesium, beryllium, magnesium, calcium, strontium, barium, zinc, cadmium, aluminum.

Organometallic compounds or hydrides which can be mixed with vanadium compounds to obtain catalysts capable of directing the copolymerization of ethylene, the higher alpha-olefin, and a cyclopolyene or alkylpolyene to the production of copolymers consisting of substantially linear macromolecules containing unsaturations and units derived from each of the three monomers in the main chain, include e.g. the following: aluminium trial-kyls, aluminum dialkylmonohalides, aluminum monoalkyldihalides, aluminum alkenyl compounds, aluminum alkylene compounds, aluminum cycloalkyl compounds, aluminum cycloalkylalkyl compounds, aluminum aryl compounds, aluminum alkyl aryl compounds, aluminum alkyl hydrides, aluminum halo hydrides, complexes of the above cited organo-aluminum compounds with, preferably, weak Lewis bases, lithium alkyls, lithium hydrides, lithium-aluminum tetraalkyls, lithium-aluminum alkyl hydrides, lithium aluminum hydrides, beryllium dialkyls, beryllium alkylhalides, beryllium diaryls, zinc dialkyls, zinc alkylhalides, zinc hydrides, calcium hydrides, cadmium dialkyls, cadmium diaryls, organometallic compounds wherein the metal may be linked with main valences not only to carbon and halogen atoms, but also to oxygen atoms linked to an organic group, such as aluminum dialkylalkoxides, and aluminum alkylalkoxyhalides.

The following organo-metallic compounds or hydrides which may be employed for preparing the catalysts are cited as illustrative, not restrictive, examples: aluminum triethyl, aluminum tri-iso-butyl, aluminum trihexyl, aluminum diethylmonochloride, aluminum diethylmonoiodide, aluminum diethylmonofluoride, aluminum diisobutylmono-chloride, aluminum monoethyl-dichloride, aluminum butenyldiethyl, aluminum isohexenyldiethyl, 2-methyl, 1,4-(diisobutylaluminum)-butane, aluminum diisobutylmonochloride complexed with anisole, aluminum tri(cyclopentylmethyl), aluminum tri(dimethyl-cyclopentylmethyl), aluminum triphenyl, aluminum tritolyl, aluminum di(cyclopentyl) monochloride, aluminum diphenyl monochloride, aluminum diethyl monohydride, aluminum diisobutylmonohydride, aluminum monoethyldihydride, aluminum chlorohydrides, lithium butyl, lithium-aluminum tetrabutyl, lithium-aluminum tetrahexyl, lithium-aluminum tetraoctyl, lithium-aluminum diisobutyldihydride, berylium dimethyl, beryllium methylchloride, beryllium diethyl, beryllium di-n-propyl, beryllium diisopropyl, beryllium di-n-butyl, beryllium di-t-butyl, beryllium diphenyl, zinc dimethyl, cadmium diethyl, cadmium di-n-propyl, cadmium di-n-butyl, cadmium diisobutyl, cadmium diphenyl, aluminum monochloromonoethylmonoethoxide, aluminum diethylpropoxide, aluminum diethylamyloxide, aluminum monochloromonopropylmonopropoxide, and aluminum monochloromonopropylmethoxide.

The vanadium compound used as the second catalyst-forming component is preferably, one which is soluble in the hydrocarbon used as the inert copolymerization medium.

Examples of such vanadium compounds are the hydrocarbon-soluble halides and oxyhalides (as e.g., $VCl_4$, $VOCl_3$, $VBr_4$) and such compounds wherein at least one of the metal valences is saturated by a hetero-atom (in particular oxygen or nitrogen) linked to an organic group, as for instance: vanadium triacetylacetonate, vanadium tribenzoylacetonate; vanadyl diacetylacetonate and the haloacetylacetonates; vanadyl trialcoholates and haloalcoholates, the tetrahydrofuranates, the etherates, the aminates of vanadium tri- and tetrachloride and of vanadyl trichloride; and the pyridates of vanadium tri- and tetrachloride and of vanadyl trichloride.

Vanadium compounds which are insoluble in hydrocarbons may also be used in preparing the catalyst, particularly the organic salts such as e.g., vanadium triacetate, tribenzoate, and tristearate.

Equally good results are obtained using any of the organo-metallic or hydride compounds listed when the vanadium compound is a halide or oxyhalide. However, when vanadium compounds in which at least one of the valences of the metal is satisfied by an oxygen or nitrogen atom linked to an organic group are used as one catalyst-forming component, then the catalyst is prepared as shown by the examples by mixing the vanadium compound with the halogen-containing compounds.

The copolymerization process of the present invention may be carried out at temperatures in the range between —80° and 125° C. When catalysts prepared from vanadium triacetylacetonate, vanadyl diacetylacetonate, vanadyl haloacetylacetonates, or in general from a vanadium compound in the presence of aluminum dialkylmonohalides are used, it is preferred to carry out both the catalyst preparation and the copolymerization at temperatures in the range between 0° C. and —80° C., preferably between —10° C. and —50° C., in order to obtain high copolymer yields per weight unit of catalyst used.

The activity of such catalyst systems prepared at the low temperatures is higher than that of the same catalyst systems prepared at temperatures in the upper part of the range —80° C. to 125° C., and the activity remains practically unaltered over a long period of time.

When the catalysts prepared from vanadium triacetylacetonate, vanadyl trialcoholates, or vanadyl haloalcoholates, and aluminum alkylhalides at temperatures in the range between 0° C. and 125° C., are used, it is profitable to operate in the presence of particular complexing agents, selected among the ethers, thioethers, tertiary amines or trisubstituted phosphines containing at least one alkyl branched group or an aromatic nucleus, since the use of the complexing agent increases the yield of copolymer obtained. The complexing agent can be an ether of the formula RYR' in which Y is oxygen or sulfur and R and R' each represent a linear or branched alkyl group containing from 1 to 14 carbons atoms or an aromatic nucleus containing from 6 to 14 carbon atoms, one of R and R' being a branched alkyl group or an aromatic nucleus; a tertiary amine of the formula

in which R to R" each represent an alkyl group containing from 1 to 14 carbon atoms or an aromatic nucleus containing from 6 to 14 carbon atoms, one of R to R" being an aromatic nucleus; or a tertiary phosphine

in which R to R" each represent an alkyl radical containing from 1 to 14 carbon atoms or an aromatic nucleus containing from 6 to 14 carbon atoms, at least one of R to R" being a aromatic nucleus.

The amount of complexing agent is preferably comprised between 0.05 and 1 mol per mol of aluminum alkylhalide.

In general, the activity of the catalyst varies according to the molar ratio between the compounds used preparing it.

According to the present invention, it has been found that when the catalyst is prepared from aluminum trialkyls and vanadium halides or oxyhalides, it is profitable to employ such catalysts wherein the mole ratio between the aluminum trialkyl and the vanadium compound is comprised between 1 and 5, preferably between 2 and 4. On the contrary when employing aluminum diethylmonochloride ($Al(C_2H_5)_2Cl$) and vanadium triacetylacetonate ($VAc_3$) the best results are attained with a molar ratio $Al(C_2H_5)_2Cl/VAc_3$ comprised between 2 and 20, preferably between 4 and 10.

The copolymerization can be carried out in an inert aliphatic, cycloaliphatic, or aromatic hydrocarbon solvent, such as butane, pentane, n-heptane, anhydrous benzene, toluene or xylene, or mixtures of such solvents. As solvents also halogenated hydrocarbons inert to the catalyst under the polymerization conditions, may be used, such as e.g. chloroform, trichloroethylene, tetrachloroethylene, chlorobenzenes, etc.

Particularly high copolymer yields can be obtained by dispensing with the extraneous inert solvent and using the monomers in the liquid states as the polymerization medium i.e., by using a solution of ethylene in the mixture of higher alpha-olefin and cyclic polyene.

The most homogeneous copolymers are obtained by maintaining the ethylene/higher alpha-olefin/cyclopolyene concentrations in the liquid phase constant, or as nearly constant as is possible, during the copolymerization. This can be facilitated by carrying out the copolymerization on a continuous basis, by continuously feeding and discharging a mixture of the monomers having a constant composition, and operating at high speed velocities.

The catalyst may be prepared in the absence of the monomers, or the catalyst components may be mixed with each other in the presence of the monomers to be copolymerized. Catalyst components may be continuously fed during the polymerization.

The molecular weight of the copolymers can be controlled by known expedients, as for instance by including small amounts of hydrogen, alkyl halides, zinc alkyls etc. in the system.

The composition of the copolymers can be varied by varying the composition of the mixture of monomers. If it is desired to produce amorphous copolymers of a cyclic polyene with ethylene and propylene, it will be profitable to keep in the liquid reactant phase a molar ratio between ethylene and propylene lower than or at most equal to 1:4, molar ratios of 1:200 to 1:4 being satisfactory; on the contrary if butene is employed instead of propylene, the ratio between ethylene and butene must be lower than or at most equal to 1:20, molar ratios of 1:1000 to 1:20 being satisfactory. Under these conditions amorphous terpolymers are obtained which contain less than about 75% by moles of ethylene. The lower limit of the ethylene content is not critical, however it is preferable for the copolymers to contain at least 5% by mols of ethylene, and ethylene must be present in the macromolecules. The alpha-olefin content in the amorphous copolymer may preferably vary from a minimum of 5% by mols up to a maximum content of about 95% by mols.

It is generally desirable to introduce into the copolymer an amount of cyclic polyene ranging from 0.1 to 20% by moles. This upper limit can be raised but especially for economic reasons it is not convenient to introduce into the copolymer an amount of polyene higher than 20% by moles.

The new copolymers of the present invention have a molecular weight, viscosimetrically determined, in excess of 20,000, corresponding to an intrinsic viscosity in excess of 0.5 as determined in tetrahydronaphthalene at 135° C., or in toluene at 30° C. (G. Morgalio, "La Chimica e l'Industria" 41, 10 (1959), pages 984–987). The intrinsic viscosity of the copolymers can vary from 0.5 up to 10 or higher values. For most practical purposes copolymers having an intrinsic viscosity of between 1 and 5 are however preferred.

The new copolymers have, as such, the properties of unvulcanized elastomers, in the sense that they exhibit low initial elastic moduli and show very high ultimate elongations. The presence of double bonds in the macromolecules makes it possible to vulcanize them by the methods normally employed for the unsaturated rubbers, particularly for the unsaturated rubbers having a low content of unsaturated bonds, and this is an important practical advantage.

The vulcanized products show high reversible elastic elongations and, particularly when reinforcing fillers are employed in the blend, such as carbon black, they show also high tensile strengths at break.

The following examples are given to better illustrate this invention; however the examples are not intended to be restrictive of the scope of the invention.

EXAMPLE 1

The reaction apparatus is made up of a glass cylinder, provided with stirrer and inlet and outlet pipes for the gases, immersed in a thermostatic bath at −20° C. The gas inlet pipe extends to the cylinder bottom and ends with a porous diaphragm. 350 ml. anhydrous n-heptane and 15 ml. cyclooctadiene-1,5 are introduced into the reactor kept in a nitrogen atmosphere. From the gas inlet pipe a gaseous mixture of propylene-ethylene is introduced, in the molar ratio 2:1, and is circulated with a velocity of 200 Nl./h. The catalyst is pre-formed in a 100 ml. flask at −20° C. by reacting, in 50 ml. n-heptane, 0.8 millimole of vanadium tetrachloride and 4 millimoles of aluminum diethylmonochloride. The thus formed catalyst is introduced into the reactor through a siphon by means of nitrogen pressure. The polymerization reaction is initiated immediately, as shown by the viscosity increase of the reaction mass. Feeding and discharging of the propylene-ethylene mixture is continue at a velocity of 400 Nl./h. After 10 minutes, the reaction is stopped by adding 20 ml. of methanol containing 0.2 g. of phenyl-beta-naphthylamine. The polymer is purified in a separatory funnel in a nitrogen atmosphere by means of repeated treatments with diluted hydrochloric acid and then with water, and coagulated with acetone. After drying under vacuum 13.5 g. of solid product are obtained, which is amorphous on X-ray examination and looks like an unvulcanized elastomer. The intrinsic viscosity of the copolymer, determined in tetrahydronaphthalene at 135° C. is 2.35.

100 parts by weight of polymer are mixed, on a roll mixer, with 1 part phenyl-beta-naphthylamine, 2 parts sulphur, 5 parts zinc oxide, 1 part tetramethylthiouram disulphide and 0.5 part mercaptobenzothiazole. The mixture is cured in a press for 30 mixtures at 150° C. A vulcanized plate is obtained showing the following characteristics:

Tensile strength at break, kg./cm.$^2$ _____ 26
Elongation at break, percent _____ 500
Modulus at 300% elongation, kg./cm.$^2$ _____ 12
Permanent set after breaking, percent _____ 8

The following characteristics are obtained when, in addition to the above mentioned ingredients, 50 parts by weight carbon black HAF (furnace black) are added and the mixture is cured under the same conditions:

Tensile strength at break, kg./cm.$^2$ _____ 210
Elongation at break, percent _____ 540
Modulus at 300% elongation, kg./cm.$^2$ _____ 80
Permanent set after breaking, percent _____ 15

EXAMPLE 2

The terpolymerization is carried out under the conditions of Example 1, employing 50 ml. cyclooctadiene-1,5 instead of 15 ml. The catalyst is pre-formed as in Example 1, however employing instead of aluminum diethylmonochloride, 2 millimoles of aluminum trihexyl. After 4 minutes polymerization time, 7.5 g. of solid product are obtained, which appears amorphous on X-ray examination and looks like an unvulcanized elastomer. The product is cured with a recipe as in Example 1, and the vulcanized product shows the following characteristics:

Tensile strength at break, kg./cm.$^2$ _____ 40.7
Elongation at break, percent _____ 520
Modulus at 300% elongation, kg./cm.$^2$ _____ 14.2
Permanent set after breaking, percent _____ 4

EXAMPLE 3

The terpolymeriaztion is carried out as in Example 1, however by employing in the catalyst preparation, instead of aluminum diethylmonochloride, 2 millimoles of 2-methyl-1,4-di(diisobutylaluminum)butane. After a polymerization time of 4 minutes, 8.5 g. of solid product are obtained, which appears amorphous on X-ray examination and has the appearance of an unvulcanized elastomer. It is then cured with the recipe shown in Example 1. The vulcanized product shows the following characteristics:

Tensile strength at break, kg./cm.² _____ 51.5
Elongation at break, percent _____ 540
Modulus at 300% elongation, kg./cm.² _____ 8.9
Permanent set after breaking, percent _____ 15

EXAMPLE 4

350 ml. anhydrous n-heptane and 15 ml. cyclooctadiene-1,5 are introduced into the reaction apparatus as described in Example 1, kept at −20° C. A gaseous mixture containing propylene and ethylene in molar ratio of 4:1 is circulated at 400 l./h. The catalyst is formed at −20° C., by dissolving 1.4 millimoles vanadium triacetylacetonate in 30 ml. anhydrous toluene and by adding 7 millimoles aluminum diethylmonochloride to the solution. The catalyst is introduced into the reactor through a siphon. Feeding and discharging of the gaseous mixture at 400 l./h. is continued. After 9 minutes, the reaction is stopped. 7.5 g. of solid, amorphous product are obtained, which looks like an unvulcanized elastomer, and is cured with the same recipe of Example 1 giving a vulcanized plate showing the following characteristics:

Tensile strength at break, kg./cm.² _____ 25.7
Elongation at break, percent _____ 600
Modulus at 300% elongation, kg./cm.² _____ 12
Permanent set after breaking, percent _____ 17

EXAMPLE 5

The copolymeriaztion is carried out as in Example 1, but the catalyst preparation and the polymerization are carried out at 25° C. Within 15 minutes, 4.5 g. solid, amorphous product are obtained, which looks like an unvulcanized elastomer and which is cured as described in Example 1. The vulcanized product has the following characteristics:

Tensile strength at break, kg./cm.² _____ 40
Elongation at break, percent _____ 520
Modulus at 300% elongation, kg./cm.² _____ 15
Permanent set after breaking, percent _____ 10

EXAMPLE 6

200 cc. anhydrous n-heptane and 10 cc. radioactive cyclooctadiene-1,5 are introduced into the reaction apparatus described in Example 1, kept at −20° C. Agitation is started and through the gas inlet pipe a gaseous propylene-ethylene mixture, in the molar ratio 2:1, is introduced and circulated with a flow-rate of 200 Nl./h.

The catalyst is pre-formed in a 100-cc. flask at −20° C. by reacting 1 millimole of vanadium tetrachloride and 5 millimoles of aluminum diethylmonochloride in 30 ml. n-heptane. The catalyst thus prepared is introduced into the reactor through a siphon by means of nitrogen pressure. Feeding and discharging of the propylene-ethylene mixture is continued at the flow-rate of 400 Nl./h. After 7 minutes, the reaction is stopped by adding 20 cc. of methanol containing 0.1 g. phenyl-beta-naphthylamine. The polymer is purified and isolated as described in Example 1. After drying under vacuum 12.9 g. of a solid product, which appears to be amorphous on X-ray examination and looks like a non-vulcanized elastomer, are obtained.

The radiochemical analysis shows the presence of a cyclooctadiene content of 1.86% by weight. The intrinsic viscosity determined in tetrahydronaphthalene at 135° C. is 1.05.

The vulcanization of the ethylene-propylene-cyclooctadiene terpolymer is carried out by using the mix (containing 50 parts of HAF carbon black) and the modalities of Example 1. A vulcanized lamina having the following characteristics is obtained:

Tensile strength at break, kg./cm.² _____ 133
Elongation at break, percent _____ 520
Modulus at 300% elongation, kg./cm.² _____ 74
Permanent set after breaking, percent _____ 28

EXAMPLES 7–10

Operating under the conditions of Example 6, increasing amounts of radioactive cyclooctadiene-1,5 are used.

In the following table the cyclooctadiene content (determined by radiochemical analysis) of the terpolymers and the properties of the vulcanizates (the vulcanizations being carried out as in Example 6) are reported.

Table 1

TERPOLYMERIZATION RUNS WITH ETHYLENE, PROPYLENE, AND INCREASING AMOUNTS OF CYCLOOCTADIENE

| Ex. | Operating Conditions | | Product | | Properties of the vulcanizates | | | |
|---|---|---|---|---|---|---|---|---|
| | Cyclooctadiene, cc. | Time, min. | Grams | Cyclooctadiene, percent by weight | Tensile strength at break, kg./cm.² | Elongation at break, percent | Modulus at 300%, kg./cm.² | Permanent set after breaking, percent |
| 7 | 12.5 | 8 | 14 | 2.25 | 172 | 480 | 103 | 14 |
| 8 [1] | 15 | 7 | 13.6 | 2.8 | 165 | 420 | 103 | 12 |
| 9 [2] | 17.5 | 5.7 | 12.5 | 2.9 | 163 | 380 | 118 | 10 |
| 10 [3] | 20 | 7 | 11.5 | 3.18 | 194 | 320 | 170 | 4 |

[1] $[\eta]=1.2$. [2] $[\eta]=1.5$. [3] $[\eta]=0.97$.

4 g. of the ethylene-propylene-cyclooctadiene terpolymer of Example 9 (containing 2.9% by weight of cyclooctadiene) are swollen at 30° C. in 1000 cc. of carbon tetrachloride, and the mass is then heated to 40–50° C. with mechanical agitation.

The clear solution obtained is cooled to 30° C. and then mixed with pure methanol while agitating until it becomes turbid.

The precipitate is dissolved again by heating the solution to about 40° C. and the temperature is then slowly reduced to 30° C.; the precipitate is left to separate in a thermostatic bath at 30°±0.1° C.

After separation the clear solution is siphoned; the gel is coagulated with methanol excess, vacuum dried in an oven at about 60° C. and weighed.

The solution remaining after the precipitation is again mixed with methanol until it becomes turbid and then, proceeding as described, a second fraciton is separated.

By repeating the operation several times, 14 fractions have been obtained. The cyclooctadiene content by weight of each fraction has been determined by radiochemical analysis, and is reported in the following Table II.

Table II

| Fraction No. | CH₃OH, cc. | Precipitated polymer, g. | Cyclooctadiene, percent by weight |
|---|---|---|---|
| 1 | 172 | 0.1679 | 2.4 |
| 2 | 6 | 0.1243 | 2.8 |
| 3 | 5 | 0.0805 | 2.8 |
| 4 | 8 | 0.2804 | 2.9 |
| 5 | 8 | 0.1825 | 2.8 |
| 6 | 8.5 | 0.2723 | 2.9 |
| 7 | 11 | 0.2685 | 2.9 |
| 8 | 12 | 0.3232 | 2.7 |
| 9 | 13 | 0.2184 | 2.8 |
| 10 | 15 | 0.4082 | 2.8 |
| 11 | 20 | 0.2139 | 2.6 |
| 12 | 35 | 0.4691 | 2.6 |
| 13 | 50 | 0.3547 | 2.6 |
| 14 | 60 | 0.0850 | 2.4 |

From Table II it can be seen that the cyclooctadiene content is almost constant in the various fractions, showing that the diene is homogeneously distributed in all the macromolecules.

EXAMPLE 11

200 cc. of anhydrous n-heptane and 20 cc. of cyclooctadiene-1,5 are introduced into the reaction apparatus described in Example 1, kept at −20° C. Agitation is started and a gaseous mixture containing propylene and ethylene in molar ratio 3:1 is introduced.

The catalyst is pre-formed at −20° C. under nitrogen by reacting 2 millimoles of vanadyl trichloride and 10 millimoles aluminum diethylmonochloride in 30 ml. anhydrous n-heptane.

The catalyst thus preformed is siphoned into the reactor by means of nitrogen pressure. Feeding and discharging of the gaseous mixture at the flowrate of 400 l./h. is continued. After 6 minutes, the reaction is stopped by the addition of 20 cc. of methanol containing 0.1 g. of phenyl-β-naphthylamine.

The product is purified and isolated as described in Example 1. After vacuum drying, 13.5 g. of a solid, amorphous product which looks like a non-vulcanized elastomer and is completely soluble in boiling n-heptane, are obtained.

The infrared spectrographic examination shows the presence of double bonds (band at 6 microns). The ethylene/propylene molar ratio is about 1:1.

The ethylene-propylene-cyclooctadiene terpolymer is vulcanized by using the same recipe and the same modalities as in Example 1.

A vulcanized lamina having the following characteristics is thus obtained:

Tensile strength at break, kg./cm.² _____ 20.6
Elongation at break, percent _____ 340
Modulus at 300% elongation, kg./cm.² _____ 15
Permanent set after breaking, percent _____ 4

EXAMPLE 12

200 cc. of anhydrous n-heptane and 20 cc. of cyclooctadiene-1,5 are introduced into the reaction apparatus described in Example 1 kept at −20° C. Agitation is started and a gaseous mixture containing propylene and ethylene in molar ratio 2:1 is introduced.

The catalyst is preformed at −20° C. under nitrogen by reacting 1 millimole of vanadium tetrachloride and 5 millimoles of aluminum diisobutylmonochloride in 30 ml. anhydrous n-heptane.

The catalyst thus preformed is siphoned into the reactor by means of nitrogen pressure. Feeding and discharging of the gaseous mixture at the flowrate of 400 l./h. is continued. After 7 minutes, the reaction is stopped by addition of 20 cc. of methanol containing 0.1 g. of phenyl-beta-naphthylamine.

The product is purified and isolated as described in Example 1.

After vacuum drying, 13 g. of a solid, amorphous product which looks like a non-vulcanized elastomer and is completely soluble in boiling n-heptane, are obtained.

The infrared spectrographic examination shows the presence of double bonds (band at 6 microns). The ethylene/propylene molar ratio is about 1:1.

The ethylene-propylene-cyclooctadiene terpolymer is vulcanized by using the same recipe and the same conditions as given in Example 1.

A vulcanized lamina having the following characteristics is thus obtained:

Tensile strength at break, kg./cm.² _____ 23.0
Elongation at break, percent _____ 350
Modulus at 300% elongation, kg./cm.² _____ 14
Permanent set after breaking, percent _____ 4

EXAMPLE 13

300 cc. of n-heptane and 50 cc. of cyclooctadiene-1,5 are introduced into the reaction apparatus described in Example 1, kept at 20° C.

Agitation is started and a gaseous mixture containing propylene and ethylene in molar ratio 2:1 is introduced and circulated with a flow-rate of 200 Nl/h.

The catalyst is preformed in a 100-cc. flask at −20° C. under nitrogen by reacting 0.8 millimole of vanadium tetrachloride and 2 millimoles of aluminum tri(3-methylbutyl) in 30 ml. anhydrous n-heptane. The catalyst thus preformed is siphoned into the reactor by means of a nitrogen pressure. The propylene-ethylene mixture is fed and discharged at the flow-rate of 400 Nl/h. After 5 minutes, the reaction is stopped by adding 20 cc. of methanol containing 0.1 g. phenyl-β-naphthylamine. The polymer is purified and isolated as described in Example 1. After drying under vacuum, 8 g. of a solid, amorphous product which looks like a non-vulcanized elastomer and is completely soluble in boiling n-heptane, are obtained.

The infrared spectrographic examination shows the presence of double bonds (band at 6 microns). The ethylene-propylene-cyclooctadiene terpolymer is vulcanized by using the same recipe and the same modalities as in Example 1.

A vulcanized lamina having the following characteristics is thus obtained:

Tensile strength at break, kg./cm.² _____ 35
Elongation at break, percent _____ 450
Modulus at 300%, kg./cm.² _____ 13
Permanent set after breaking, percent _____ 5

EXAMPLE 14

200 cc. of anhydrous n-heptane and 25 cc. of cyclooctadiene-1,5 are introduced in the the reaction apparatus described in Example 1, kept at −20° C.

Through the gas inlet pipe a gaseous propylene-ethylene mixture in the molar ratio of 4:1 is introduced and circulated with a flow-rate of 200 Nl./h.

The catalyst is pre-formed in a 100-cc. flask at −20° C. by reacting 2.8 millimoles of vanadium trichloride pyridinate and 14 millimoles of aluminum diethylmonochloride, in 30 ml. anhydrous toluene. The catalyst thus obtained is kept at −10° C. for 5 minutes and is then siphoned into the reactor by means of nitrogen pressure.

The propylene-ethylene mixture is fed and discharged at the flow-rate of 400 Nl./h. After 30 minutes from the beginning, the reaction is stopped by adding 20 cc. of methanol containing 0.1 g. phenyl-beta-naphthylamine.

The polymer is purified and isolated as described in Example 1. After drying under vacuum, 7.4 g. of a solid, amorphous product completely soluble in boiling n-heptane and having the appearance of a non-vulcanized elastomer, are obtained.

The infrared spectrographic examination shows the presence of double bonds (band at 6 microns). The ethylene/propylene molar ratio is about 1:1.

The ethylene-propylene-cyclooctadiene terpolymer is vulcanized by using the same recipe and the same modalities as in Example 1.

A vulcanized lamina having the following characteristics is thus obtained:

Tensile strength at break, kg./cm.$^2$ _____ 40
Elongation at break, percent _____ 620
Modulus at 300% elongation, kg./cm.$^2$ _____ 8.5

EXAMPLE 15

The reaction apparatus is similar to that described in Example 1 but has a diameter of 7.5 cm. and a capacity of 1000 cc.

700 cc. of anhydrous n-heptane and 50 cc. of cyclooctadiene-1,5 are introduced into said apparatus, kept at −20° C.

Through the gas inlet tube a gaseous ethylene-propylene mixture in the molar ratio of 1:2 is introduced and circulated at the flow-rate of 500 Nl./h.

The catalyst is pre-formed in a 100-cc. flask at −20° C. under nitrogen by reacting 1 millimole of vanadium tetrachloride and 5 millimoles of aluminum diethyl monochloride in 30 cc. of anhydrous n-heptane.

The catalyst thus pre-formed is siphoned into the reactor under nitrogen pressure.

The ethylene-propylene mixture is continuously fed and discharged at the flow-rate of 500 Nl./h. 20 minutes after the beginning, the reaction is stopped by adding 20 cc. of methanol containing 0.1 g. of phenyl-beta-naphthylamine. The product is purified and isolated as described in Example 1.

After vacuum drying, 40 g. of a solid product, amorphous on X-ray examination, completely soluble in boiling n-heptane, and having the appearance of a non-vulcanized elastomer are obtained. Its Mooney viscosity ML (1+4) is 54.

100 parts by weight of the ethylene-propylene-cyclooctadiene terpolymer are mixed in a laboratory roll mixer with 50 parts of HAF carbon black, 1 part of phenyl-beta-naphthylamine, 2 parts of sulfur, 5 parts of zinc oxide, 1 part of tetramethylthiuram disulphide and 0.5 part of mercaptobenzothiazole.

The mix is vulcanized in a press at 150° C. for different times. The properties of the vulcanizate as a function of the polymerization time are shown in Table III:

*Table III*

| Vulcanization time, minutes | Tensile strength at break, kg./cm.$^2$ | Elongation at break, percent | Modulus at 300%, kg./cm.$^2$ | Permanent set after breaking,[1] percent |
|---|---|---|---|---|
| 30 | 230 | 420 | 149 | 7 |
| 60 | 234 | 420 | 150 | 6.25 |
| 120 | 208 | 340 | 174 | 5.25 |

[1] After 1 hour under stretch at 200% elongation at 20° C.: reading after 1 minute.

EXAMPLE 16

The polymerization is carried out as in Example 15 except that pure hydrogen, fed separately at the flow rate of 25 Nl./h., is circulated with the reaction mixture.

The polymerization time is 20 minutes. 40 g. of a product having a Mooney viscosity ML (1+4) of 20 are obtained.

The ethylene-propylene-cyclooctadiene terpolymer is vulcanized at 150° C. for various times, using the same recipe as in the preceding example.

The properties of the vulcanizates are shown in Table IV:

*Table IV*

| Vulcanization time, minutes | Tensile strength at break, kg./cm.$^2$ | Elongation at break, percent | Modulus at 300%, kg./cm.$^2$ | Permanent set after breaking,[1] percent |
|---|---|---|---|---|
| 30 | 203 | 520 | 116 | 9 |
| 60 | 208 | 460 | 124 | 7.5 |
| 120 | 203 | 460 | 133 | 8 |

[1] After 1 hour under stretch at 200% elongation at 20° C.: reading after 1 minute.

EXAMPLE 17

200 cc. anhydrous n-heptane and 20 cc. cyclooctadiene-1,5 are introduced into the reaction apparatus described in Example 1, kept at −10° C. Through the gas inlet pipe a gaseous ethylene-butene-1 mixture, in the molar ratio 1:3 is introduced and circulated with a flow-rate of 200 Nl./h.

The catalyst is formed in a 100 cc. flask at −20° C. under nitrogen, by reacting in 30 cc. anhydrous n-heptane 1 millimole vanadium tetrachloride and 5 millimoles aluminum diethylmonochloride.

The catalyst thus prepared is siphoned into the reactor by means of nitrogen pressure. Feeding and discharging of the ethylene-butene-1 gaseous mixture is continued at the flow rate of 400 Nl./h. 5 minutes after the beginning, the reaction is stopped by adding 20 cc. of methanol containing 0.1 g. phenyl-beta-naphthylamine.

The polymer is purified and isolated as described in Example 1.

After vacuum drying, 12 g. of a solid product, amorphous by X-ray examination and having the appearance of a non-vulcanized elastomer, are obtained.

The infrared examination of this product shows the presence of unsaturations (band at 6 micron) and of methylenic sequences of different length (bands comprised between 13 and 13.8 microns).

The ethylene-butene-cyclooctadiene terpolymer is vulcanized by means of the recipe and modalities of Example 1. A vulcanized lamina having following characteristics is obtained.

Tensile strength at break, kg./cm.$^2$ _____ 34
Elongation at break, percent _____ 450
Modulus at 300% elongation, kg./cm.$^2$ _____ 12
Permanent set after breaking, percent _____ 6

EXAMPLE 18

A 20 liter autoclave provided with comb stirrer, external cooling jacket with ammonia circuit, and 1″ sphere-valve for discharging the polymer from the bottom, is used.

Into the reactor, perfectly cleaned with a 3% AlEt$_2$Cl solution in n-heptane and evacuated, 4500 cc. of cyclooctadiene-1,5 and 7500 cc. of propylene are introduced.

The temperature is lowered to −10° C. and the reactor is pressured with ethylene up to 0.55 atm., which corresponds to an ethylene concentration, in the liquid phase, of 4%.

The following ingredients are thereafter introduced into the autoclave: 2.3 g. AlEt$_2$Cl in n-teptane (10% conc.), 0.72 g. VCl$_4$ in n-heptane (2% conc.) as catalyst components and 1.2 g. ZnEt$_2$ in n-heptane (10% conc.) as molecular weight regulator.

The reaction starts immediately as is demonstrated by a temperature increase and by a lowering of the ethylene concentration. Ethylene is then continuously fed during the reaction.

During the polymerization, which lasts 90 minutes, a total amount of 2.3 g. AlEt$_2$Cl and 0.72 g. VCl$_4$ is again introduced in successive stages each spaced 20 minutes from the other.

630 g. of product having following characteristics are discharged from the autoclave:

ML (100° C. 1+4)=30
$C_3$ percent mol=45

100 parts by weight of terpolymer are mixed in a laboratory roll mixer with 50 parts HAF black, 1 part phenyl-beta-naphthylamine, 2 parts sulfur, 5 parts zinc oxide, 1 part methylthiuram disulfide, and 0.5 parts mercaptobenzothiazole.

The mix is cured in a press for 30 minutes at 150° C.
A vulcanized product having following characteristics is obtained:

Tensile strength at break, kg./cm.$^2$ _____ 200
Elongation at break, percent _____ 460
Modulus at 300% elongation, kg./cm.$^2$ _____ 100
Permanent set after breaking, percent _____ 9.5

EXAMPLE 19

This polymerization run is carried out under the same conditions as Example 18, except that $H_2$ instead of $ZnEt_2$ is used as molecular weight regulator.

$H_2$ is fed together with ethylene, in which it is contained in a 2% concentration.

670 g. of terpolymer having the appearance of a non-vulcanized elastomer are obtained after 90 minutes.

The product has following characteristics:

ML 100° C. (1+4)=16
$C_3$ percent mol=50

This product is vulcanized by means of the same recipe used in the preceding example. The vulcanized product has following characteristics:

Tensile strength at break, kg./cm.$^2$ _____ 210
Elongation at break, percent _____ 440
Modulus at 300%, kg./cm.$^2$ _____ 110
Permanent set after breaking, percent _____ 8

EXAMPLE 20

The reaction apparatus is made up of a glass cylinder, having a diameter of 5.5 cm. and a capacity of 750 cc., provided with a stirrer and inlet and outlet gas tubes, dipped into a thermostatic bath at −20° C. The gas inlet tube reaches the cylinder bottom and ends with a porous diaphragm (diameter 3.5 cm.).

350 cc. of anhydrous n-heptane and 50 cc. of cyclooctadiene-1,5 are introduced into the reactor, kept under nitrogen. Through the gas inlet tube, a gaseous propylene-ethylene mixture, in the molar ratio of 2:1, is introduced and circulated with the velocity of 200 Nl/h. Into a 100 cc. flask, kept under nitrogen atmosphere, the catalyst is pre-formed at −20° C. by reacting, in 30 cc. of anhydrous n-heptane, 1 millimole of vanadium tetrachloride and 3.75 millimoles of beryllium diethyl. The pre-formed catalyst is introduced into the reactor through a syphon by means of nitrogen pressure. Polymerization reaction starts immediately, as shown by the increase in viscosity of the reacting mass.

The ethylene-propylene mixture is continuously fed and discharged at a velocity of 400 Nl./h.

4 minutes after the start, the reaction is stopped by adding 20 cc. of methanol containing 0.2 g. of phenyl-beta-naphthylamine. The polymer is purified in a separating funnel, under nitrogen atmosphere, through treatments with diluted hydrochloric acid and then with water, and coagulated with acetone.

After vacuum drying, 9 g. of solid product are obtained, amorphous at the X-rays, completely soluble in boiling n-heptane, having the appearance of a non-vulcanized elastomer. Infrared spectrographic examination shows the presence of double bonds (band at 6 microns).

The ethylene-propylene molar ratio is approximately equal to 1.

100 parts by weight of the terpolymer are mixed in a roll mixer, with one part phenyl-beta-naphthylamine, 2 parts sulphur, 5 parts zinc oxide, 1 part tetramethylthiuram disulphide and 0.5 part mercaptobenzothiazole. The obtained mixture is vulcanized in a press for 30 minutes at 150° C. A vulcanized lamina is obtained, having the following characteristics:

Tensile strength at break, kg./cm.$^2$ _____ 36
Elongation at break, percent _____ 540
Modulus at 300%, kg./cm.$^2$ _____ 13
Permanent set after breaking, percent _____ 8

EXAMPLE 21

Into the same apparatus as described in Example 20, kept at −20° C., 350 cc. of anhydrous n-heptane and 60 cc. of cyclooctadiene-1,5 are introduced.

From the gas inlet tube, a gaseous propylene-ethylene mixture having a molar ratio of 2:1 is introduced and circulated at a velocity of 200 Nl./h.

In a 100 cc. flask, kept under nitrogen atmosphere, the catalyst is preformed at −20° C., by reacting, in 30 cc. of anhydrous n-heptane, 1 millimole of vanadium tetrachloride and 3.75 millimoles of di-n-propyl beryllium. The pre-formed catalyst is fed into the reactor through a syphon by means of nitrogen pressure.

The propylene-ethylene mixture is continuously fed and discharged at a velocity of 400 Nl./h.

7 minutes after starting, the reaction is stopped by adding 20 cc. of methanol containing 0.1 g. of phenyl-beta-naphthylamine. The copolymer is purified and isolated as described in Example 20. After vacuum drying, 12 g. of solid product are obtained, amorphous at the X-rays, having the appearance of a non-vulcanized elastomer, completely extractable with boil n-heptane.

Infrared spectographic examination shows the unsaturations band (band at 6 microns).

The ethylene - propylene - cyclooctadiene copolymer is vulcanized with the same mixture and conditions of Example 20. A vulcanized lamina is obtained, showing the following characteristics:

Tensile strength at break, kg./cm.$^2$ _____ 34
Elongation at break, percent _____ 480
Modulus at 300%, kg./cm.$^2$ _____ 12
Permanent set after breaking, percent _____ 6

When, in addition to the above mentioned ingredients, 50 parts by weight of carbon black HAF are added and the vulcanization is carried out as hereabove described, the vulcanized plate obtained has the following characteristics:

Tensile strength at break, kg./cm.$^2$ _____ 253
Elongation at break, percent _____ 520
Modulus at 300%, kg./cm.$^2$ _____ 123
Permanent set after breaking, percent _____ 10

EXAMPLE 22

Into the reaction apparatus described in Example 20, kept at −20° C., 350 cc. of anhydrous n-heptane and 50 cc. of cyclooctadiene-1,5 are introduced. Through the gas inlet tube a gaseous propylene-ethylene mixture, in the molar ratio of 2:1, is introduced and circulated at the velocity of 200 Nl./h. In a 100 cc. flask, the catalyst is pre-formed at −20° C. under nitrogen atmosphere by reacting, in 30 cc. of anhydrous n-heptane, 6 millimoles of vanadium tetrachloride and 15 millimoles of lithium butyl.

The pre-formed catalyst is fed through a syphon into the reactor by means of nitrogen pressure. The propylene-ethylene mixture is continuously fed and discharged at a velocity of 400 Nl./h.

1 hour after starting, the reaction is stopped by adding 20 cc. of methanol containing 0.1 g. of phenyl-beta-naphthylamine.

This copolymer is purified and isolated as described in Example 20. After vacuum drying, 2.8 g. of solid product are obtained, amorphous at the X-rays, having the appearance of a non-vulcanized elastomer, completely soluble in boiling n-heptane. The infrared spectrum shows the presence of unsaturations bands (band at 6 micron). The ethylene-propylene molar ratio is approximately equal to 1.

The ethylene-propylene-cyclooctadiene terpolymer is vulcanized with the same mixture and conditions as those of Example 20.

A vulcanized lamina is obtained, having the following characteristics:

Tensile strength at break, kg./cm.$^2$ _____ 50
Elongation at break, percent _____ 630
Modulus at 300%, kg./cm.$^2$ _____ 15

EXAMPLE 23

Into the apparatus described in Example 20, kept at −20° C., 200 cc. of anhydrous n-heptane and 30 cc. of cyclooctadiene-1,5 are introduced.

Through the gas inlet tube, a gaseous ethylene-propylene mixture, having a molar ratio of 1:2, is introduced and circulated at a velocity of 200 Nl./h. In a 100 cc. flask, the catalyst is pre-formed, at −20° C., under nitrogen atmosphere, by reacting in 50 cc. of anhydrous toluene, 5 millimoles of lithiumtetrahexyl and 2 millimoles of vanadium tetrachloride. The catalyst thus pre-formed is introduced into the reactor through a syphon by means of nitrogen pressure. The gaseous propylene-ethylene mixture is continuously fed and discharged at a velocity of 200 Nl./h. In a 100 cc. flask, the catalyst is pre-formed, at −20° C., under nitrogen atmosphere, by reacting in 50 cc. of anhydrous toluene, 5 millimoles of lithium aluminum trihexyl and 2 millimoles of vanadium tetrachloride. The catalyst thus pre-formed is introduced into the reactor through a syphon by means of nitrogen pressure. The gaseous propylene-ethylene mixture is continuously fed and discharged at a velocity of 400 Nl./h.

1 hour after starting, the reaction is stopped by adding 20 cc. of methanol containing 0.1 g. of phenyl-beta-naphthylamine. The terpolymer is purified and isolated as described in Example 20.

After vacuum drying, 3.2 g. of solid product are obtained, amorphous at the X-rays, having the appearance of a non-vulcanized elastomer, completely soluble in boiling n-heptane. It is vulcanized with the same mixture and conditions as in Example 20.

A vulcanized lamina is obtained, having the following characteristics:

Tensile strength at break, kg./cm.$^2$ _____ 52
Elongation at break, percent _____ 660
Modulus at 300%, kg./cm.$^2$ _____ 15

EXAMPLE 24

Into the same apparatus as described in Example 1, kept at −20° C., 200 cc. of anhydrous n-heptane and 20 cc. of cyclooctadiene-1,5 are introduced. Through the gas inlet tube a gaseous propylene-ethylene mixture, having a molar ratio of 2:1, is introduced and circulated at a velocity of 200 Nl./h. Into a 100 cc. flask, the catalyst is pre-formed at −20° C., under nitrogen atmosphere, by reacting in 30 cc. of anhydrous n-heptane 1 millimole of vanadium tetrachloride and 5 millimoles of aluminum diethylmonohydride. The catalyst thus pre-formed is introduced into the reactor through a syphon by means of nitrogen pressure. The gaseous propylene-ethylene mixture is continuously fed and discharged at a velocity of 400 Nl./h.

6 minutes after starting, the reaction is stopped by adding 20 cc. of methanol containing 0.1 g. of phenyl-beta-naphthylamine. The copolymer is purified and isolated as described in Example 1.

After vacuum drying, 9 g. of solid product are obtained, amorphous at the X-rays, having the appearance of a non-vulcanized elastomer, completely extractable with boiling n-heptane.

The copolymer is vulcanized with the same mixture and conditions of Example 1. A vulcanized lamina is obtained, showing the following characteristics:

Tensile strength at break, kg./cm.$^2$ _____ 25
Elongation at break, percent _____ 460
Modulus at 300%, kg./cm.$^2$ _____ 10
Permanent set after breaking, percent _____ 6

EXAMPLE 25

Into the same apparatus as described in Example 1, kept at −20° C., 200 cc. of anhydrous n-heptane and 30 cc. of cyclooctadiene-1,5 are introduced. Through the gas inlet tube a gaseous propylene-ethylene mixture, having a molar ratio of 2:1, is introduced and circulated at a velocity of 200 Nl/h. Into a 100 cc. flask, the catalyst is pre-formed at −20° C., under nitrogen atmosphere, by reacting in 50 cc. of anhydrous toluene 2 millimoles of vanadium tetrachloride and 2 millimoles of lithium-aluminum diisobutyldihydride. The catalyst thus preformed is introduced into the reactor through a syphon by means of nitrogen pressure. The gaseous propylene-ethylene mixture is continuously fed and discharged at a velocity of 200 Nl./h.

1 hour after starting, the reaction is stopped by adding 20 cc. of methanol containing 0.1 g. of phenyl-beta-naphthylamine. The copolymer is purified and isolated as described in Example 1. After vacuum drying 3 g. of solid product are obtained, amorphous at the X-rays, having the appearance of a non-vulcanized elastomer, completely soluble in boiling n-heptane.

This polymer is vulcanized with the same mixture and conditions as those of Example 1. A vulcanized lamina is obtained, having the following characteristics:

Tensile strength at break, kg./cm.$^2$ _____ 48
Elongation at break, percent _____ 620
Modulus at 300%, kg./cm.$^2$ _____ 16

The foregoing examples show the preparation of terpolymers containing, in the macromolecules, monomeric units of cyclooctadiene-1,5, ethylene and propylene or butene.

Similar terpolymers are obtained when the cyclooctadiene-1,5 is replaced by other non-conjugated polyenes, as for instance cycloheptadiene-1,4, cyclooctadiene-1,4, cyclodecadiene-1,6; cyclohexadiene-1,5, cyclododecadiene-1,7, cyclododecatriene-1,5,9, or by alkyl cyclopolyenes, and particularly non-conjugated alkylcyclodiolefins, as for instance: 1-methylcyclooctadiene-1,5; 3-methylcyclooctadiene-1,5; 3,4-dimethylcyclooctadiene-1,5; and 3,7-dimethylcyclooctadiene 1-5.

Likewise, the propylene and butene-1 shown in the illustrative examples can be replaced by any alpha-olefin having the general formula CH$_2$=CHR, wherein R is an alkyl radical containing up to 6 carbon atoms, and as diselosed above, more than one such aliphatic alpha-olefin can be copolymerized with the ethylene and cyclic polyene.

Modifications can be made of course, in carrying out the invention without departing from the spirit thereof, and it is intended to include in the scope of the appended claims all modifications which will be apparent to those skilled in the art from the disclosures made herein and the illustrative examples given.

What is claimed is:

1. Sulfur-vulcanizable, substantially linear, amorphous, high molecular weight copolymers of (1) ethylene, (2) at least one aliphatic alpha-olefin having the formula

CH$_2$=CHR in which R is an alkyl radical containing from 1 to 6 carbon atoms, and (3) a monocyclic, non-conjugated polyene selected from the group consisting of cycloheptadiene-1,4,
cyclooctadiene-1,5, cyclooctadiene-1,4,
cyclodecadiene-1,6,
cyclodecadiene-1,5,
cyclododecadiene-1,7,
cyclodecatriene-1,5,9,
1-methyl-cyclooctadiene-1,5,
3-methyl-cyclooctadiene-1,5,
3,4-dimethyl-cyclooctadiene-1,5, and
3,7-dimethyl-cyclooctadiene-1,5, said copolymers having an intrinsic viscosity higher than 0.5, consisting essentially of macromolecules containing unsaturations and each of which contains units of the monomers (1), (2) and (3) in the macromolecular main chain, and being further characterized in that units of the monomer (3) are not directly linked to each other in the main chain.

2. Copolymers according to claim 1, further characterized in consisting essentially of macromolecules each of which contains, in the main chain, units of ethylene, an aliphatic alpha-olefin, and cyclooctadiene-1,5.

3. Copolymers according to claim 1, further characterized in consisting essentially of macromolecules each of which contains, in the main chain, units of ethylene, propylene, and cyclooctadiene-1,5.

4. Copolymers according to claim 1, further characterized in containing from 0.1 to 20% by moles of the non-conjugated monocyclic polyene.

5. Copolymers according to claim 1, further characterized in consisting essentially of macromolecules each of which contains units of ethylene, butene-1, and cyclooctadiene-1,5.

6. A copolymer of claim 1, sulfur-cured to an elastomeric vulcanizate.

7. The process for preparing sulfur-vulcanizable, substantially linear copolymers as defined in claim 1, which process comprises polymerizing a mixture of the monomers (1), (2) and (3), in a liquid phase, in contact with a catalyst obtained by mixing
(1) a vanadium compound selected from the group consisting of (a) vanadium halides and vanadium oxyhalides, and (b) vanadium compounds in which at least one of the vanadium valences is satisfied by a heteroatom selected from the group consisting of oxygen and nitrogen linked to an organic group, with
(2) a second catalyst-forming component selected from the group consisting of organometallic compounds of metals belonging to groups I to III inclusive of the Mendeléeff Periodic Table, hydrides of said metals, complex organo-metallic compounds of said metals, and complex hydrides of said metals, the second catalyst-forming component (2) containing halogen at least when component (1) is a vanadium compound of type (b).

8. The process according to claim 7, characterized in that the catalyst is obtained by mixing the second catalyst-forming component with a hydrocarbon-soluble vanadium compound.

9. The process according to claim 7, characterized in that the catalyst is obtained by mixing the second catalyst-forming component with a vanadium halide.

10. The process according to claim 7, characterized in that the catalyst is obtained by mixing the second catalyst-forming component with a vanadium oxyhalide.

11. The process according to claim 7, characterized in that the catalyst is obtained by mixing the second catalyst-forming component with a vanadium compound in which at least one of the valences of the vanadium is satisfied by a hetero-atom linked to an organic group.

12. The process according to claim 7, characterized in that the catalyst is obtained by mixing the second catalyst-forming component with a vanadium compound in which at least one of the valences of the vanadium is satisfied by an oxygen atom linked to an organic group.

13. The process according to claim 7, characterized in that the catalyst is obtained by mixing the second catalyst-forming component with a vanadium compound in which at least one of the valences of the vanadium is satisfied by a nitrogen atom linked to an organic group.

14. The process according to claim 7, characterized in that the catalyst is obtained by mixing the second catalyst-forming component with an organic salt of vanadium.

15. The process according to claim 7, characterized in that the catalyst is obtained by mixing an organometallic component containing halogen with a vanadium compound in which at least one of the valences of the vanadium is satisfied by an oxygen atom linked to an organic group.

16. The process according to claim 7, characterized in that the catalyst is obtained by mixing an organometallic component containing halogen with a vanadium compound in which at least one of the valences of the vanadium is satisfied by a nitrogen atom linked to an organic group.

17. The process according to claim 7, characterized in that the catalyst is obtained by mixing an organometallic component containing halogen with a vanadium halide.

18. The process according to claim 7, characterized in that the catalyst is obtained by mixing an organometallic component containing halogen with a vanadium oxyhalide.

19. The process according to claim 7, characterized in that the catalyst is obtained by mixing vanadium tetrachloride with a dialkyl aluminum monochloride.

20. The process according to claim 7, characterized in that the mixed monomers are polymerized at a temperature between $-80°$ C. and $+125°$ C.

21. The process according to claim 7, characterized in that the catalyst is prepared at a temperature between $0°$ C. and $-80°$ C., and the mixed monomers are polymerized in contact therewith at a temperature in said range.

22. The process of claim 7, characterized in that the catalyst is prepared at a temperature between $-10°$ C. and $-50°$ C., and the mixed monomers are polymerized in contact therewith at a temperature in said range.

23. The process according to claim 7, characterized in that the catalyst is obtained by mixing an alkyl aluminum halide with a vanadium compound selected from the group consisting of vanadium triacetylacetonate, vanadyl trialcoholates, and vanadyl haloalcoholates, and the mixed monomers are polymerized in contact therewith at a temperature between $0°$ C. and $125°$ C., and in the presence of at least one complexing agent selected from the group consisting of ethers, thioethers, tertiary amines, tri-substituted phosphines containing at least one branched alkyl group, and trisubstituted phosphines containing at least one aromatic group, the amount of the complexing agent used being between 0.05 and 1.0 mol per mol of alkyl aluminum halide.

24. The process according to claim 7, characterized in that the catalyst is obtained by mixing an aluminum trialkyl with a vanadium compound (a), and the molar ratio between the aluminum trialkyl and vanadium compound is between 1 and 5.

25. The process according to claim 7, characterized in that the catalyst is obtained by mixing an aluminum trialkyl with a vanadium compound (a), and the molar ratio between the aluminum trialkyl and vanadium compound is between 2 and 4.

26. The process according to claim 7, characterized in that the catalyst is obtained by mixing diethyl aluminum monochloride with vanadium triacetylacetonate, the molar ratio between the aluminum and vanadium compounds being between 2 and 20.

27. The process according to claim 7, characterized in that the catalyst is obtained by mixing diethyl aluminum monochloride with vanadium triacetylacetonate, the molar ratio between the aluminum and vanadium compounds being between 4 and 10.

28. The process according to claim 7, characterized in that the mixed monomers are maintained in the liquid state and the polymerization is carried out in the absence of an extraneous solvent.

29. The process according to claim 7, characterized in that the mixed monomers are polymerized in an inert solvent.

30. The process according to claim 7, characterized in that the polymerization of the mixed monomers is carried out continuously.

31. The process according to claim 30, further characterized in that increments of the catalyst-forming components are added periodically to the polymerization system while maintaining constant the ratio between the concentrations of the monomers in the liquid phase.

32. The process according to claim 30, further characterized in that increments of the catalyst-forming components are added continuously to the polymerization system while maintaining constant the ratio between the concentrations of the monomers in the liquid phase.

33. The process according to claim 7, characterized in that the monomers copolymerized are ethylene, propylene, and the monocyclic non-conjugated polyene, and the ethylene/propylene molar ratio in the liquid phase is not higher than 1:4.

34. The process according to claim 7, characterized in that the monomers copolymerized are ethylene, butene-1, and the monocyclic non-conjugated polyene, and the ethylene/butene-1 molar ratio in the liquid phase is not higher than 1:25.

References Cited by the Examiner

UNITED STATES PATENTS 3,000,866  9/1961  Tarney _____ 260—80.5
3,033,835  5/1962  Adamek et al. _____ 260—79.5

JOSEPH L. SCHOFER, *Primary Examiner.*

M. P. HENDRICKSON, *Assistant Examiner.*